United States Patent [19]

Anne et al.

[11] Patent Number: 4,624,037

[45] Date of Patent: Nov. 25, 1986

[54] APPARATUS AND PROCESS FOR THE CONTINUOUS PRODUCTION OF CAPACITORS OF THE STACKED TYPE

[75] Inventors: Jean Anne; Claude Roy; Daniel Fleuret, all of Bagnolet, France

[73] Assignee: LCC Cice Compagnie Europeenne de Composants, Bagnolet, France

[21] Appl. No.: 783,811

[22] Filed: Oct. 7, 1985

Related U.S. Application Data

[63] Continuation of Ser. No. 449,696, Dec. 14, 1982, abandoned.

[30] Foreign Application Priority Data

Dec. 31, 1981 [FR] France ................................ 81 24583

[51] Int. Cl.[4] ................................ H01G 32/00

[52] U.S. Cl. ................................ 29/25.42; 29/593; 83/79; 83/154; 209/574; 324/73 AT; 324/158 F; 414/5

[58] Field of Search ................................ 29/25.42, 543; 324/73 AT, 158 F, 158 P; 209/573, 574; 83/79, 154; 414/5

[56] References Cited

U.S. PATENT DOCUMENTS

| | | | |
|---|---|---|---|
| 2,327,484 | 8/1943 | Ashcroft | 209/573 |
| 2,731,706 | 1/1956 | Grouse | 29/25.42 |
| 2,997,294 | 8/1961 | Gitzendanner | 324/73 AT |
| 3,654,532 | 4/1972 | Rayburn | 361/304 |

*Primary Examiner*—Carl E. Hall

*Attorney, Agent, or Firm*—Cushman, Darby & Cushman

[57] ABSTRACT

The present invention relates to a process for the continuous production of capacitors of the stacked type, wherein a stock or matrix capacitor in the form of a parallelepipedal bar is cut into elementary capacitors of which the lateral connections formed by the application of molten metal (Schoop process) are subsequently connected to electrical connecting wires. In accordance with the invention, the transfer from the cutting station to the soldering station for the connecting wires is performed by means of a gripper whose jaws are applied on the lateral connections formed by the application of molten metal and make it possible to inject an electrical checking signal between the plates of the capacitor during the transfer operation.

13 Claims, 1 Drawing Figure

1 2 22 20 6 5 7 21 23 13 16 3 24 8 15 14 17 9 25

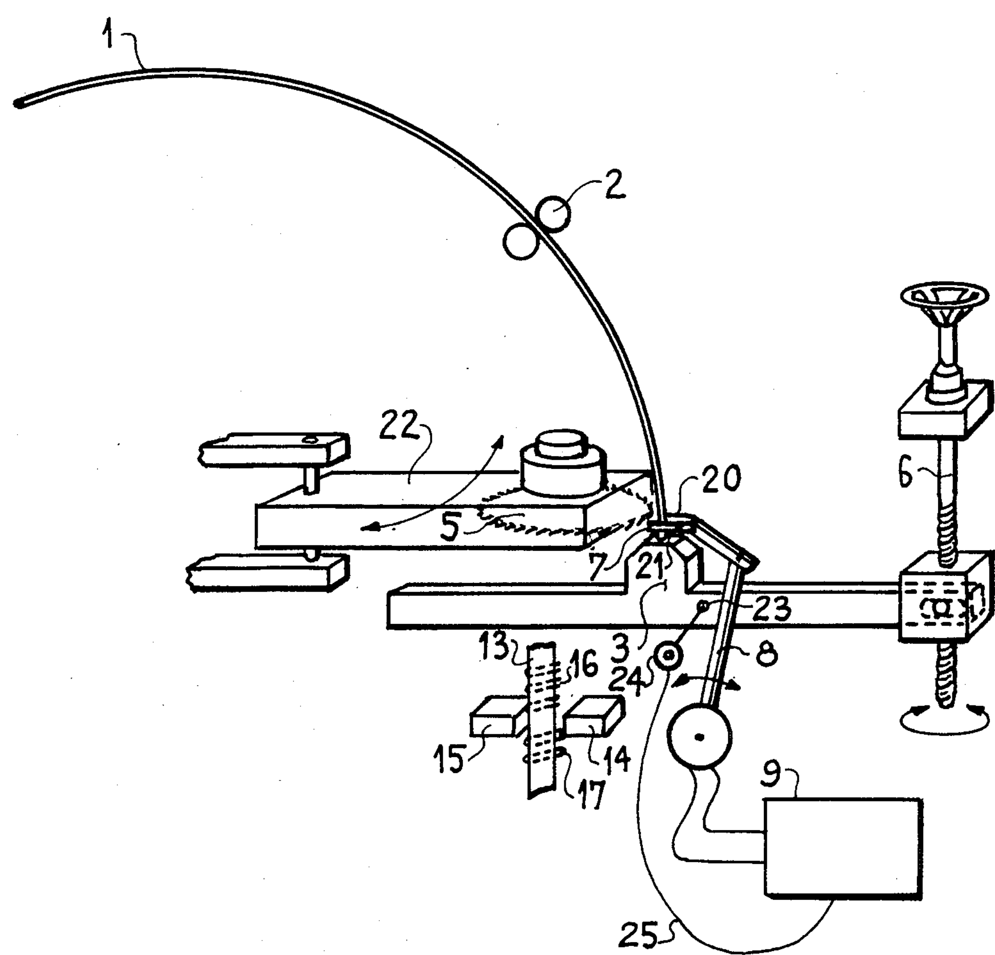
1
2
22
20
5
7
21
6
23
3
13
16
8
24
15
14
17
9
25

APPARATUS AND PROCESS FOR THE CONTINUOUS PRODUCTION OF CAPACITORS OF THE STACKED TYPE

This application is a continuation of Ser. No. 449,696, filed on Dec. 14, 1982, now abandoned.

BACKGROUND OF THE INVENTION

The present invention relates to a process for the continuous production of capacitors of the stacked type, wherein a stock or matrix capacitor is firstly produced in the form of a parallelepipedal bar comprising a plurality of metallised dielectric films of which the metallised layers of even and odd number are interconnected respectively by lateral connections formed by the application of molten metal, e.g. the Schoop process, the said matrix capacitor then being cut by sawing into unitary capacitors whose lateral connections formed by the application of molten metal are thereupon joined to electrical connecting wires.

A process of this kind is disclosed, for example, in U.S. Pat. No. 2,731,706. In the capacitor production process disclosed in this patent, two dielectric films metallised on one of their surfaces are simultaneously produced on a large-diameter wheel, in such a manner as to form a stack. These two metallised dielectric films are generally of substantially identical width but wound slightly staggered with respect to each other, in such a manner that it is thereby possible to connect the films of even number on the one hand and the films of odd number on the other hand by lateral electrical connections formed by the application of molten metal. Connecting wires are then connected to the lateral connections formed by application of molten metal, after which the individual capacitors are separated from the stock or matrix capacitor by sawing, the stock or matrix capacitor being held on the wheel of large diameter on which it had been wound. A process of this kind is particularly advantageous for high-volume series production of capacitors, but does not make it possible to perform an electrical check on the capacitors prior to soldering on the lateral connecting wires. This problem becomes particularly important if the capacitors are subsequently clipped on belts for automatic feed to production lines, since the connections commonly consist of hairpins of which the two branches are interconnected and which no longer permit electrical testing after being soldered to the conections formed by the application of molten metal.

SUMMARY OF THE INVENTION

The process of the invention makes it possible to eliminate these disadvantages while permitting continuous operation without delaying the production line. According to the invention, the process is characterised in that it comprises a stage for verifying the electrical parameters of the capacitor, situated between the sawing stage and the stage for establishing the electrical connections. In the process of the invention, the separation of the stock or matrix capacitor into individual capacitors is performed by sawing, each individual capacitor being transferred after sawing and separation from the matrix capacitor towards the station for soldering on the electrical connecting wires. During this transfer operation, the electrical test on the capacitors is performed, which makes it possible to eject faulty capacitors.

According to a preferred embodiment, the extremity of the stock or matrix capacitor in the form of a parallelepipedeal bar is held by its electrical connections formed by the application of molten metal between the jaws of a gripper before a single capacitor is sawn off, the latter then being transferred by means of the gripper towards a station for soldering on the electrical connecting wires, the stage for verification of the electrical parameters of the capacitor being implemented by means of electrical signal fed across the jaws of the gripper as soon as the sawing operation is completed, and before the beginning of the stage for joining the electrical connecting wires. A process of this kind is particularly advantageous because by means of a gripper which grasps the unitary capacitor after being sawn off to transfer the same towards the station for soldering the connecting wires, the electrical test of the capacitor is equally performed, each jaw of the gripper equally playing the part of a test electrode, the jaws being applied on the lateral electrical connections formed by application of molten metal. The stage for verification of electrical parameters will preferably comprise several sub-stages of which the start and/or termination are controlled by electrical and/or mechanical means. In a manner known per se, the electrical testing stages may be synchronised by means of synchronising pulses triggered, for example, by completion of the sawing operation, the duration of the whole of the operations being shorter than the period of transfer by means of the grippers from the sawing station to the station for soldering the lateral connecting wires. However, use will preferably be made for the triggering of a particular substages of mechanical means such as a lever or cam activated by the displacement of the gripper or of electrical means such as a photo-electric cell activated by the passage of the said gripper.

BRIEF DESCRIPTION OF THE DRAWING

A clearer understanding of the invention will be gained from the following description of an embodiment, given by way of non-limiting example, and in conjunction with the accompanying drawing which illustrates a diagrammatical view of an apparatus for the continuous production of capacitors in accordance with the process of the invention.

DESCRIPTION OF THE PREFERRED EMBODIMENT

The stock or matrix capacitor 1 having the form of a rounded parallelepipedal bar is guided by means of a plurality of guiding rollers 2 and bears against a stop 3 (the rounded form of the bar 1 is attributable to the fact that the bar is obtained in this particular case by winding on a wheel of large diameter followed by radial parting off). The extremity of the bar 1 situated close to the stop 3 is grasped between the jaw 20 and 21 of the gripper 7. This gripper is connected via a hinged lever 8 to an electronic circuit 9, known per se, for the electrical testing of capacitors. A circular saw 5 makes it possible to cut off the extremity of the bar 1 to the required length above the gripper 7. The length of the cut-off portion of bar 1 can be selected by adjusting the relative positioning of stop 3 by means of threaded adjustment wheel 6. Saw 5 is situated on a movable arm 22 able to be moved aside and enabling the gripper to pivot around lever 8 in such a manner as to place the individual capacitor obtained after cutting by the saw in contact with hairpin connections 16 mounted on a perforated strip or tape 13. Perforated strip 13 includes connections in the form of hairpins 16 as is well known to those in the art and will not therefore be described in detail in this case. After the individual capacitor has been inserted between the arms of the hairpin situated opposite the lateral connections formed by the application of molten metal, it is then soldered electrically to the arms of the hairpin by means of soldering electrodes 14 and 15. After this soldering operation, an assembly such as 17 comprising an individual capacitor joined to the lateral branches of a connection in the form of a hairpin is obtained, the assembly being secured on the strip 13.

According to the invention, the cutting of the individual capacitor is performed by means of the saw blade 5 and during the transfer of the individual capacitor between the soldering electrodes 14 and 15, the appropriate electrical tests are performed to determine whether the capacitor is acceptable or should be rejected. These tests, which are well known to those in the art, may be of multiple in kind and will not be described in particular. For example, they may consist or measuring the capacitance of the capacitor in such a manner as to discover whether the same lies within the tolerances required. They may equally consist or feeding so-called de-shorting signals into the capacitor by causing the latter to be traversed by an appropriate electrical current commonly formed by a sinusoidal wave. An equally well known treatment, known as a regeneration treatment, consists of applying a direct voltage of increasing amplitude across the terminals of the said capacitor in such a manner as to engender a volatilisation of the plates close to the faults of the dielectric, also referred to as conductive points. This treatment may equally consist of applying one or more of the treatments referred to in the foregoing in sequential manner, by reversing the polarity of the voltages applied. Finally, it is equally possible to perform successive charging and discharging actions on the capacitor through a resistance in order to test the strength of the internal connections.

All these testing operations may be performed sequentially between the instant in which the unitary capacitor has been cut off by means of the saw 5 and the instant in which it is inserted between the branches of the connection of hairpin form 16. These different treatments will be synchronised with the displacement of the lever 8 and its duration. A treatment of this kind will be performed by means of the generator 9 which does not present any special constructional difficulties to one versed in the art. The transition from one kind of treatment to another, for example, from the de-shorting treatment to the regeneration treatment, may be implemented by means of an electronic control synchronised with the onset of the operation for transfer of the capacitor by means of the lever 8. To this end, it is sufficient to measure the time needed for the transfer, and to allocate a predetermined period to each treatment, the termination of one treatment triggering the onset of the next treatment. The operation may be actuated initially by the return of the saw blade 5 to its initial position on its lever 22. It is equally possible to initiate one or more treatments by mechanical or electrical detection of the displacement of the lever 8, for example when the latter interrupts the light beam to a photoelectric cell, indicated by the elements 23 and 24, this latter element being connected via 25 to the processing signal generator 9. The displacement of the lever 8 may equally be detected by means of a lever or any other similar member struck by the lever 8 during its transfer displacement.

We claim:

1. A process for the continuous production of stacked type capacitors comprising the steps of:

(a) making a parallelepipedic mother capacitor by simultaneously winding on a wheel a pair of metallized dielectric films, (b) respectively connecting odd and even metallized layers of the mother capacitor by spraying molten metal on the lateral faces thereof, (c) gripping said laterally sprayed faces of an end portion of said mother capacitor with a pair of gripper jaws, each jaw of said pair of gripper jaws engaging a respective one of said laterally sprayed faces, (d) sawing said end portion from the mother capacitor to thereby form an individual capacitor while maintaining the gripping thereof according to step (c), (e) transfering said individual capacitor by means of the gripper jaws towards a soldering station for soldering electrical connecting wires while simultaneously, during transfer thereof to said soldering station, electrically testing the parameters of the individual capacitor by means of electrical signals fed across the pair of gripper jaws, said electrical testing being initiated when the sawing operation according to step (d) is completed and before soldering the connecting wires is started, (f) placing the individual capacitor between the arms of a hairpin-type connecting wire mounted on a perforated strip, said arms being situated opposite the laterally sprayed faces of the individual capacitor, and (g) soldering said arms on said sprayed faces, said pair of gripper jaws thereafter returning to grip the laterally sprayed faces of the mother capacitor.

2. A process according to claim, 1 in which the testing of the electrical parameters comprises several sub-stages and wherein the activation and/or the termination of the sub-stages are controlled by mechanical and/or electrical means.

3. A process according to claim 2, in which the means of controlling activation and/or a termination are implemented by interaction between the gripper and an electrical triggering device.

4. A process according to claim 3, in which the triggering device comprises a lever or a photo-electric cell.

5. A process according to claim 1, wherein step (e) is practiced by means of a pivoting arm which pivots between a first position where the pair of gripper jaws is gripping the mother capacitor, to a second position where pair of the gripper jaws releases the individual capacitor.

6. A process for producing capacitors comprising the sequential steps of:

(a) guiding a strip of stock capacitor having metal-sprayed lateral faces along a feed path;

(b) gripping the metal-sprayed lateral faces of an end portion of said strip by means of mechanical gripper jaws;

(c) cutting the end portion from said strip to thereby form an individual capacitor while maintaining the gripping of said gripper jaws thereon; and (d) transferring said individual capacitor, by means of said gripper jaws, to a hairpin connector, wherein during transfer of said individual capacitor to said hairpin connector subsequent to cutting said individual capacitor from said strip there is simultaneously practiced the step of electrically testing said capacitor by feeding an electrical test signal across the gripper jaws.

7. A process as in claim 8 further comprising the steps of:

(e) placing the individual capacitor between arms of the hairpin connector such that the metal-sprayed lateral faces thereof are oppositely situated relative to said arms; and (f) soldering the arms of the hairpin connector to said individual capacitor.

8. An apparatus for the continuous production of hairpin-type capacitors comprising in combination:

guide means for guiding a strip of stock capacitor having metal sprayed lateral faces along a feed path to a separation station;

feeding means for sequentially feeding a plurality of hairpin connectors to an assembly station, remote from said separation station, along an assembly path;

gripper means for gripping an end portion of said strip at said separation station, said gripper means including transfer means for moving said gripper means between said separation and said assembly stations;

cutting means for separating said end portion from said strip to thereby form an individual capacitor while said end portion is gripped by said gripper means;

said transfer means thereafter for transferring said gripper means and thus said separated end portion from said separation station and to said assembly station wherein said capacitor is assembled with a predetermined one of said hairpin connectors;

said apparatus further comprising, testing means electrically connected to said gripper means for performing electrical tests upon said capacitor as said capacitor is being transferred from said separation station to said assembly station; and detection means coupled to said testing means for detecting displacement of said gripper means from said separation station to said assembly station to initiate testing of said capacitor by said testing means such said testing means electrically tests said capacitor simultaneously with the transfer of said capacitor from said separation station to said assembly station.

9. An apparatus as in claim 8, wherein said gripper means includes a pair of gripper jaw means for gripping a respective metal sprayed lateral face of said end portion, and a pivoting arm which is pivotal between said separation and assembly stations.

10. An apparatus as in claim 9 wherein said detection means includes photoelectric cell means interruptable by said pivoting arm during pivotal movement thereof between said separation station and said assembly station.

11. An apparatus as in claim 8 further comprising soldering means located along said assembly path for soldering said capacitor to said hairpin connector.

12. An apparatus as in claim 8 further comprising arm means defining a surface for establishing said separation position.

13. An apparatus as in claim 11 wherein said arm means includes adjustment means for adjusting the dimension between said defined surface and said cutting means to thereby adjustably select the size of said end portion separated from said strip and thus the size of said capacitor.

* * * * *